United States Patent

Masaoka

[11] Patent Number: 5,690,761
[45] Date of Patent: Nov. 25, 1997

[54] PNEUMATIC TIRE INCLUDING BLOCKS

[75] Inventor: Ken Masaoka, Tokyo, Japan

[73] Assignee: Bridgestone Corporation, Tokyo, Japan

[21] Appl. No.: 652,120

[22] Filed: May 23, 1996

Related U.S. Application Data

[63] Continuation of Ser. No. 334,367, Nov. 3, 1994, abandoned.

[30] Foreign Application Priority Data

| Nov. 5, 1993 | [JP] | Japan | 5-277132 |
| Mar. 15, 1994 | [JP] | Japan | 6-043603 |
| Sep. 9, 1994 | [JP] | Japan | 6-216246 |

[51] Int. Cl.$^6$ ............................................. B60C 107/00
[52] U.S. Cl. .................................................. 152/209 R
[58] Field of Search ........................ 152/209 R, 209 B, 152/209 D

[56] References Cited

U.S. PATENT DOCUMENTS

| 1,522,448 | 1/1925 | Harig | 152/209 R |
| 4,722,378 | 2/1988 | Carolla et al. | 152/209 R |
| 5,322,106 | 6/1994 | Kamegawa et al. | 152/209 R |

FOREIGN PATENT DOCUMENTS

| 2312385 | 12/1976 | France . | |
| 3609488 | 10/1986 | Germany . | |
| 3712155 | 10/1987 | Germany . | |
| 60-105208 | 7/1985 | Japan . | |
| 178809 | 8/1991 | Japan | 152/209 R |
| 204308 | 9/1991 | Japan | 152/209 R |
| 81307 | 3/1992 | Japan | 152/209 R |
| 151307 | 5/1992 | Japan | 152/209 B |
| 154409 | 5/1992 | Japan | 152/209 B |
| 6-166304 | 6/1994 | Japan . | |
| 1549347 | 8/1979 | United Kingdom | 152/209 R |

OTHER PUBLICATIONS

Patent Abstracts of Japan, vol. 18, No. 496 (M–1674) 16 Sep. 1994 & JP–A–06 166 304 (Bridgestone Corporation) 14 Jun. 1994.

Patent Abstracts of Japan, vol. 16, No. 446 (M–1311) 17 Sep. 1992 & JP–A–04 154 409 (Yokohama Tire & Rubber Co., Ltd.) 27 May 1992.

*Primary Examiner*—Steven D. Maki
*Attorney, Agent, or Firm*—Sughrue, Mion, Zinn, Macpeak & Seas, PLLC

[57] ABSTRACT

The radius of curvature of the end portion of the block of a tire at the equatorial plane side of the tire is the same as the radius of the tire thereat. On the other hand, the radius of curvature of the end portion of the block at the shoulder side is smaller than the radius of the tire thereat, and the point which protrudes furthest is between the center and the trailing edge portion of the block 16. The shape of the radially outward surface of the block protrudes further toward the shoulder side end portion, which is an area in which the wear of the leading edge portion progresses furthest. The ground contact pressure at the shoulder side becomes even lower. Accordingly, the leading edge portion can smoothly slide against the road surface. As a result, the progress of the wear from the leading edge portion is promoted, and the effect of preventing the heel-and-toe wear becomes higher.

10 Claims, 13 Drawing Sheets

COMPARATIVE EXAMPLE

PNEUMATIC TIRE INCLUDING BLOCKS

This is a Continuation of application Ser. No. 08/334,367 filed Nov. 3, 1994, now abandoned.

BACKGROUND OF THE INVENTION

1. Field of the Invention

The present invention relates to a pneumatic tire having a block pattern. In particular, it relates to a pneumatic tire having a high effect on preventing heel-and-toe wear.

2. Description of the Related Art

In a pneumatic tire having a block pattern, given that the radius of curvature of the block having a cross section, in which the block surface is orthogonal to a rotational axis of the tire, is equal to the radius of the outer circumference of the tire, the ground contact pressure of a leading edge portion and the ground contact pressure of a trailing edge portion are the same until wear occurs. When wear occurs at a trailing edge portion of the block, the ground contact pressures become different as shown in FIG. 10. As a result, irregular wear called the heel-and-toe wear occurs. When the heel-and-toe wear occurs, not only the outer appearance of the tire is deteriorated but also the gripping ability of the tire is reduced.

In order to prevent the heel-and-toe wear, it has been proposed in Japanese Utility Model Application Laid-Open No. 60-105208 in which the leading edge portion side of the block is formed to smoothly slide against the road surface and the wear of the leading edge portion side is promoted to delay the occurrence of the heel-and-toe wear. However, depending on circumstances, there is a drawback in that irregular wear progresses even further.

The heel-and-toe wear usually progresses as illustrated in FIG. 11. The amount of wear is smaller toward the leading edge portion and larger toward the trailing edge portion. In order to prevent the heel-and-toe wear, it suffices if the wear is made small at the trailing edge portion and if the wear is made large at the leading edge portion. On the basis of this idea, as illustrated in FIGS. 6 and 12, Japanese Patent Application Laid-Open No. 6-166304 proposes a pneumatic tire in which the outer contour of the block, which has a cross section orthogonal to the rotational axis of the tire, is formed in the shape of an arc so that the outer contour of the block is smaller than the contour of the outer diameter of the tire. By promoting the wear of the leading edge portion, the occurrence of the heel-and-toe wear is able to be delayed.

However, a drawback arises in that there is a case in which the effect of promoting the wear of the leading edge portion side is small depending on the shape of the block surface.

In addition, when wear progresses to the period between the intermediate stages and final stages of wear, even if the block has the above-described shape, the wear of the axial direction inner side of the trailing edge portion tends to gradually become larger than the wear of the axial direction outer side thereof, when viewing the block in the axial direction of the tire. In view of a primary purpose of effectively preventing the heel-and-toe wear throughout the life of the wear, it cannot have been said that the pneumatic tire was satisfactory.

SUMMARY OF THE INVENTION

With the aforementioned in view, an object of the present invention is to provide a pneumatic tire which can maintain a higher heel-and-toe wear resistant performance.

The present invention is accomplished in light of the above-described facts. The first aspect of the present invention is a pneumatic tire in which a pair of side walls and a cylindrical tread, which extends over the side walls, are connected in a toroidal shape, and in at least one of the regions from the position of the equatorial plane of the tread to the tread end. The pneumatic tire includes blocks which are segmented by at least one circumferential direction groove and a plurality of lug grooves, which intersect the circumferential direction groove and open at the tread ends. The invention is further characterized in that: an outer surface of the block is formed so that a radius of curvature in the circumferential direction of the tire of the block at the axial direction outer side of the tire is smaller than a radius of curvature in the circumferential direction of the tire of the block at the equatorial plane side of the tire, and the radius of curvature in the circumferential direction of the tire of the block at the axial direction outer side of the tire is smaller than a radius of the tire at the end portions of the axial direction outer side.

In the pneumatic tire of the first aspect, with respect to the block segmented by the circumferential direction groove, which is located at the tread, and by the plurality of lug grooves, which intersect the circumferential direction groove and open at the tread ends, the radius of curvature of the block in the circumferential direction of the tire is basically smaller than the radius of the outer circumference of the tire. Accordingly, a difference is provided in advance at the leading edge portion of the block so that the leading edge portion smoothly slides against the road surface similarly to the trailing edge portion. The outer surface of the block is formed so that the radius of curvature in the circumferential direction of the tire of the block at the axial direction outer side is smaller than the radius of curvature thereof at the equatorial plane side. In addition, at the axial direction outer side, the radius of curvature in the circumferential direction of the tire of the block is smaller than the radius of the tire. Therefore, during running of a vehicle, the ground contact pressure of the block at the equatorial plane side becomes relatively high so that sliding of the portion at the equatorial plane side becomes harder. As a result, the wear of the block at the equatorial plane side is effectively prevented. Whatever the shape of the block, the wear of the entire block can be well balanced from the intermediate stages to the final stages of wear.

The second aspect of the present invention is a pneumatic tire in which a pair of side walls and a cylindrical tread, which extends over the side walls, are connected in a toroidal shape, and in at least one of the regions from the position of the equatorial plane of the tread to the tread end, the pneumatic tire includes blocks which are segmented by at least one circumferential direction groove and a plurality of lug grooves, which intersect the circumferential direction groove and open at the tread ends. This aspect of the invention is further characterized in that: the block comprises a first zone, which is located at the axial direction inner side, and a second zone, which is located at the axial direction outer side, the second zone includes an outer surface whose radius of curvature in the circumferential direction of the tire gradually decreases toward the axial direction outer side from the radius of curvature in the circumferential direction of the tire of the outer surface of the first zone.

In the pneumatic tire of the second aspect, with respect to the block segmented by the circumferential direction groove, which is located at the tread, and by the plurality of lug grooves, which intersect the circumferential direction groove and open at the tread ends. The radius of curvature of the block in the circumferential direction of the tire is basically smaller than the radius of outer circumference of the tire. Accordingly, a difference is provided in advance at the leading edge portion of the block so that the leading edge portion smoothly slides against the road surface similarly to the trailing edge portion. The block is formed by the first zone, which is located at the axial direction inner side, and the second zone, which is located at the axial direction outer side and which includes an outer surface. The above-described radius of curvature of the block gradually decreases from the radius of curvature of the outer surface of the first zone toward the axial direction outer side. Therefore, during running of a vehicle, the ground contact pressure of the first zone becomes relatively high so that sliding of the first zone becomes harder. As a result, wear of the block at the first zone is effectively prevented. Whatever the shape of the block, the wear of the entire block can be well balanced from the intermediate stages to the final stages of wear.

In the pneumatic tire of the above-described first and the second aspects, when viewing the block in the cross section orthogonal to the axis, the radius of curvature may not be the same provided that the outer surface of the block is similar to the shape of an arc, which has the predetermined radius R of curvature in the circumferential direction of the tire.

Moreover, in the pneumatic tire of the first and the second aspects, it is preferred that the convex portion (the top portion) at the axial direction outer side is located at the block between the circumferential direction central portion and the trailing edge portion.

Further, the third aspect of the present invention is a pneumatic tire in which a pair of side walls and a cylindrical tread, which extends over the side walls, are connected in a toroidal shape, and in at least one of the regions from the position of the equatorial plane of the tread to the tread end, the pneumatic tire includes blocks which are segmented by at least one circumferential direction groove and a plurality of lug grooves, which intersect the circumferential direction groove and open at the tread ends. This aspect of the invention is further characterized in that: the radius of curvature in the circumferential direction of the tire at the shoulder side end portion of the block having the circumferential direction contour line of the block of the imaginary tread is r; the radius of the outer circumference of the tire at the shoulder side end portion is $r_T$; the length of the block of the tread in the circumferential direction of the tire at the shoulder side end portion is L; the distance from the rotational axis of the tire to the bottom of the lug groove, which is located at the circumferential direction side of the tire at the shoulder side end portion, is $r_B$; the length of the block of the tread in the circumferential direction of the tire between a circumferential direction end "A" of the block of the tread at the leading edge side of the shoulder side end portion and a point "B" at which the block protrudes furthest in a radially outward direction of the tire is aL ("a" denotes a ratio between, on the one hand, the length "L" of the block at the shoulder side end portion, and on the other hand, the length "aL" between the circumferential direction end "A" of the block of the tread at the leading edge side of and the point "B", wherein the length "L" of the block in the circumferential direction of the tire is 1, and $0.5 \leq a \leq 1.0$.); the angle which is defined by the circumferential direction end "A" of the block of the tread at the leading edge side and the point "B" when viewed from the rotational axis of the tire is θ (=$aL/r_T$: wherein radians are used for the unit of the angle); the height of the circumferential direction end "A" of the block of the tread at the leading edge side which is measured from the bottom of the lug groove is $T_1$; the height of the point "B" which is measured from the bottom of the lug groove is $T_2$; the ratio of the height $T_1$ of the circumferential direction end A of the block of the tread at the leading edge side to the height $T_2$ of the point B, i.e., $T_1/T_2=X$, is expressed in the following formula (1); in a region between, on the one hand, the circumferential direction contour line of the block of the imaginary tread which passes through the circumferential direction end "A" of the block of the tread at the leading edge side and the point "B" when the value of "X" is 0.6, and on the other hand, the circumferential direction contour line of the block of the imaginary tread which passes through the circumferential direction end "A" of the block of the tread at the leading edge side and the point "B" when the value of "X" is 0.95, the surface contour of the block of the actual tread at the shoulder side end portion is formed in a smooth curve which protrudes in the radially outward direction of the tire; the radius R of curvature, in the circumferential direction of the tire, of the surface contour of the block of the actual tread at an equatorial plane side end portion of the tire substantially corresponds to the radius $R_T$ of the outer circumferential contour of the tire at the equatorial plane side end portion of the tire; and the surface of the block of the tread smoothly connects the equatorial plane side end portion of the tire and the shoulder side end portion.

$$X = \frac{(r_T - r)\cos\theta + \sqrt{r^2\cos^2\theta - (r_T^2 - 2r_Tr)\sin^2\theta} - r_B}{r_T - r_B} \quad (1)$$

The above formula (1) is obtained as follows.

As shown in FIG. 2, the straight line which connects the rotational axis O of the tire and the point B, in which the block protrudes furthest in the radially outward direction of the tire, is an axis x.

The radius of curvature of the contour line of the block of the tread in the circumferential direction of the tire (the radius r of curvature of the block in the circumferential direction of the tire) is expressed in the following formula (2). The straight line which passes through the rotational axis of the tire and the circumferential direction end A of the block of the tread at the leading edge side is expressed in the following formula (3). The nodal point, i.e., the position of the circumferential direction end A of the block of the tread at the leading edge side can be obtained from the following formulae (2) and (3). Next, $T_1$, $T_2$, and the ratio between $T_1$ and $T_2$, i.e., X are obtained.

$$\{x - (r_T - r)\}^2 + y^2 = r^2 \quad (2)$$

$$y = x \tan\theta \quad (3)$$

By substituting the formula (2) for the formula (3), $$x^2(1 + \tan^2\theta) - 2(r_T - r)x + (r_T^2 - 2r_Tr) = 0 \quad (4)$$

$$\therefore \frac{X^2}{\cos^2\theta} - 2(r_T - r)X + (r_T^2 - 2r_Tr) = 0 \quad (5)$$

$$\therefore X = \frac{(r_T - r) \pm \sqrt{(r_T - r)^2 - \frac{r_T^2 - 2r_Tr}{\cos^2\theta}}}{\frac{1}{\cos^2\theta}} \quad (6)$$

$$= (r_T - r)\cos^2\theta \pm \cos\theta \sqrt{\cos^2\theta(r_T - r)^2 - (r_T^2 - 2r_Tr)}$$

Here, $$OA = \frac{X}{\cos\theta} \qquad (7)$$

Therefore, $$\begin{aligned} OA &= (r_T - r)\cos\theta + \sqrt{\cos^2\theta(r_T-r)^2 - (r_T^2 - 2r_Tr)} \qquad (8) \\ &= (r_T - r)\cos\theta + \sqrt{r^2\cos^2\theta - (r_T^2 - 2r_Tr)\sin^2\theta} \end{aligned}$$

Since $OA = r_B + T_1$, $$T_1 = (r_T - r)\cos\theta + \sqrt{r^2\cos^2\theta - (r_T^2 - 2r_Tr)\sin^2\theta} - r_B \qquad (9)$$

Since $T_2 = r_T - r_B$, $$\frac{T_1}{T_2} = X = \frac{(r_T - r)\cos\theta + \sqrt{r^2\cos^2\theta - (r_T^2 - 2r_Tr)\sin^2\theta} - r_B}{r_T - r_B} \qquad (10)$$

In the pneumatic tire of the third aspect, for the equatorial plane side end portion of the tire, the portion at which the block protrudes furthest in the radially outward direction of the tire (the portion which passes through the points A, B and C at the shoulder side end portion) is located at the block between the circumferential direction central portion of the tire and the trailing edge portion. Therefore, the ground contact pressure from the period when the tire is new to the period when the tire is in the initial stages of wear becomes maximum at the block between the circumferential direction central portion and the trailing edge portion, if the equatorial plane side end portion of the tire is excluded. Accordingly, when the pneumatic tire is rotated, the leading edge portion side, whose height is low and whose ground contact pressure is low, of the block slides against the road surface more than the circumferential direction central portion and the trailing edge portion. The speed in which the wear progresses at the leading edge portion side of the block thereby becomes quicker. The progress of heel-and-toe wear after the initial stages of wear can be delayed. However, this effect varies in accordance with the shape of the protrusion of the block surface. In order to cause more wear at the leading edge portion, regardless of the shape of the protrusion, the shape of the radially outward surface of the block protrudes further toward the shoulder end portion, at which the wear of the leading edge portion progresses furthest. The portion of the block which is nearest to the equatorial plane side of the tire is formed in the shape of a circumferential direction, which runs along the arc of the normal tire. Accordingly, while the ground contact pressure at the equatorial plane side, which is the leading edge portion, becomes higher, the ground contact pressure at the shoulder side becomes even lower. The progress of wear from the leading edge portion can be promoted and the substantial prevention of the heel-and-toe wear becomes possible.

As described hereinbefore, because the pneumatic tire of the present invention is structured as above, the present invention achieves a superior effect in that the higher heel-and-toe resistant performance can be maintained until the final stages of wear. In particular, heel-and-toe wear, which easily occurs at the shoulder block of the tread, can be effectively prevented.

DESCRIPTION OF THE PREFERRED EMBODIMENTS

First Embodiment

A pneumatic tire relating to a first embodiment of the present invention will be described in accordance with FIGS. 1 through 5.

Figure 1:
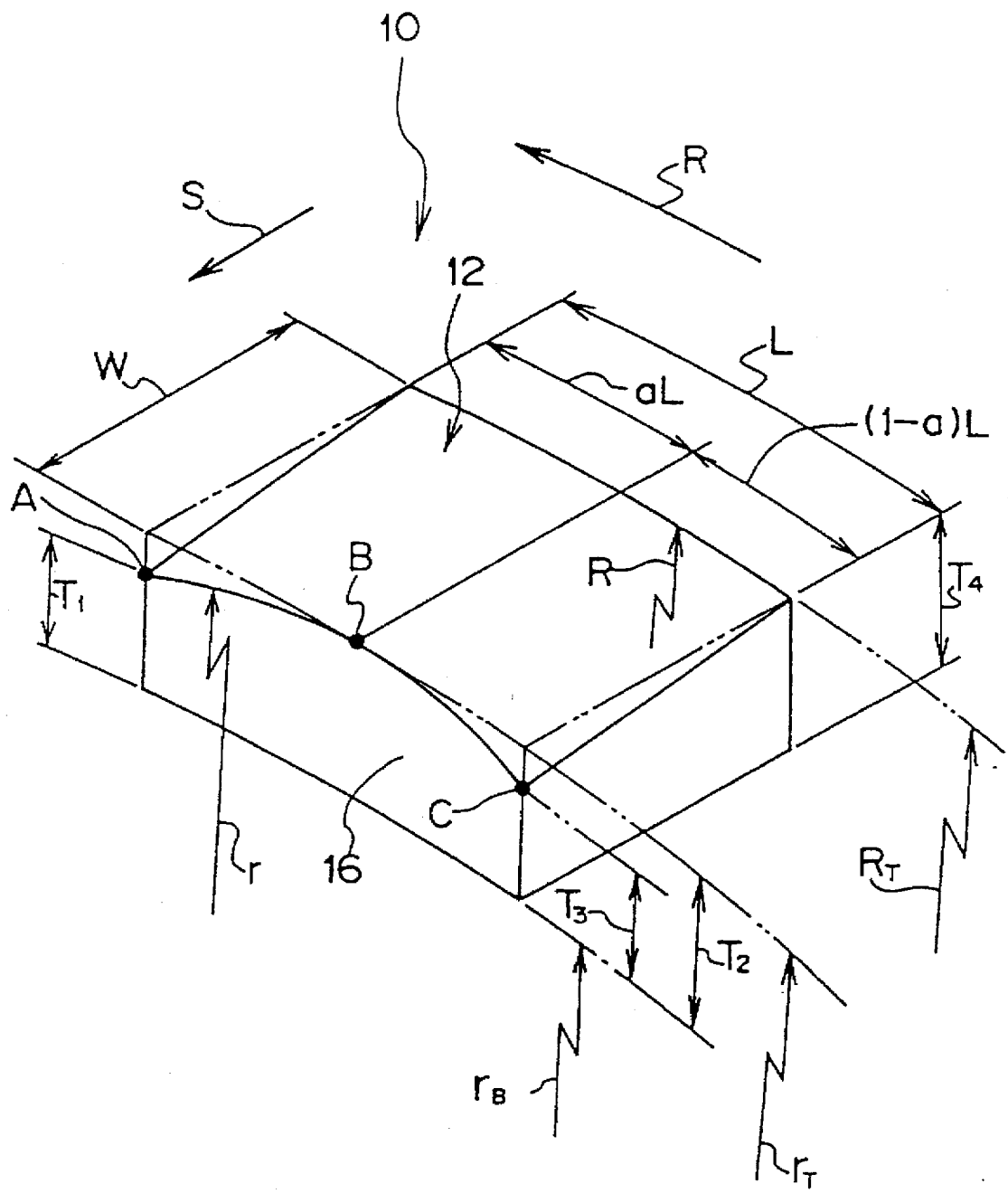
FIG. 1 is a perspective view of a block of a pneumatic tire relating to a first embodiment of the present invention.
Figure 2:
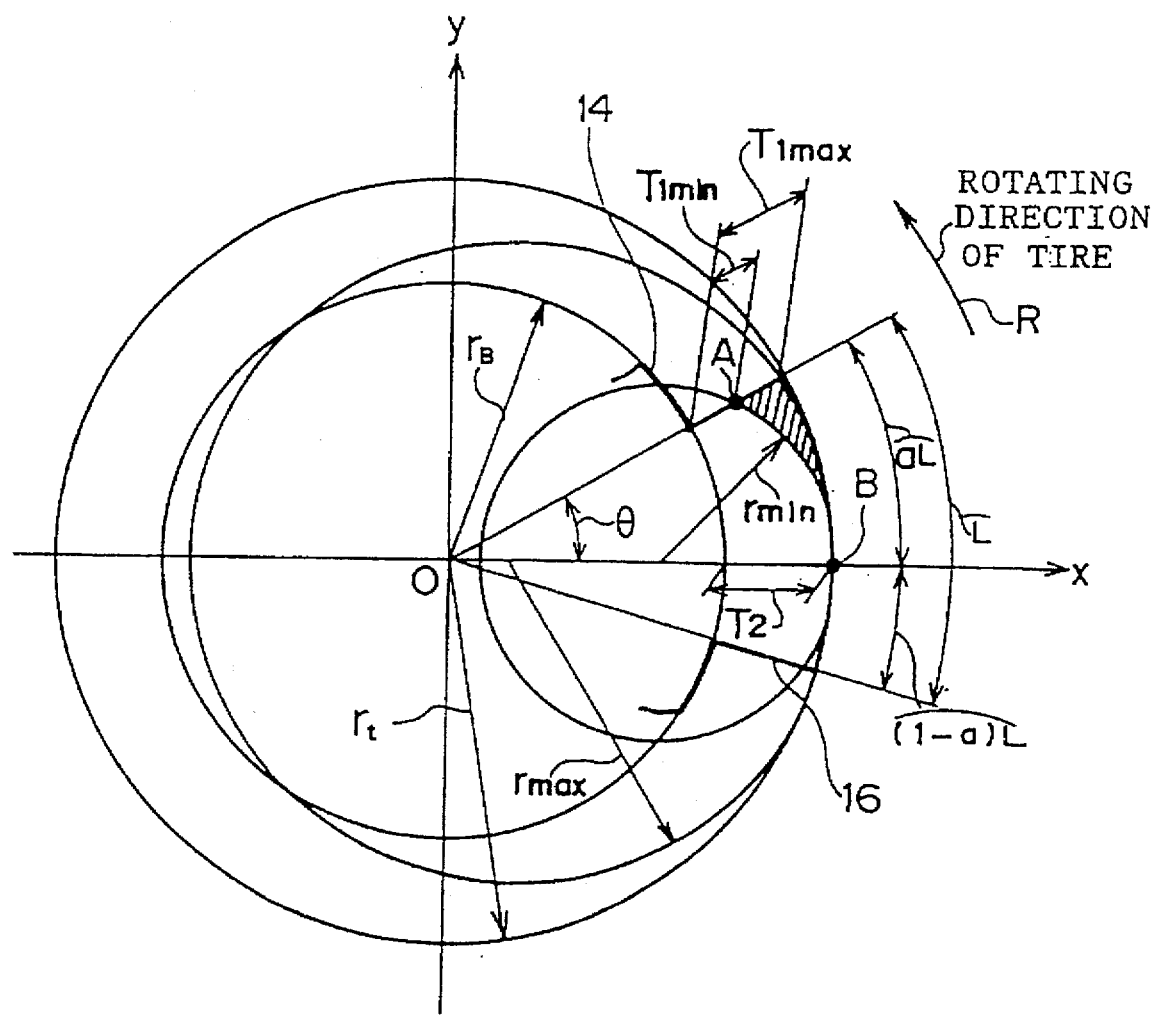
FIG. 2 is a cross-sectional view, of the block orthogonal to an axis of the tire, which illustrates dimensions of the pneumatic tire relating to the present embodiment.

As shown in FIGS. 1 and 2, a tread 12 of a pneumatic tire 10 includes a plurality of blocks 16 divided by circumferential direction grooves (unillustrated) and lug grooves 14 to form a so-called block pattern. Because an internal structure of the pneumatic tire 10 of the present invention has an ordinary structure, description thereof is omitted.

As shown in FIG. 1 (the direction of arrow S shows the direction of a shoulder, and the direction of arrow R shows the rotation direction of the tire), when the tire is new, the surface contour of the block 16 of the tread, which block has a cross section orthogonal to a rotational axis of the tire (unillustrated), differs along the rotational axis of the tire.

The following terms are expressed in the formula (11). As shown in FIGS. 1 and 2, the radius of curvature in the circumferential direction of the tire at the shoulder side end portion (the end portion in the direction of arrow S in FIG. 1) of the block 16 having the circumferential direction contour line of the block of the imaginary tread is r; the radius of the outer circumference of the tire at the shoulder side end portion is $r_T$; the length of the block of the tread in the circumferential direction of the tire at the shoulder side end portion is L; the distance from the rotational axis of the tire to the bottom of the lug groove 14, which is located at the circumferential direction side of the tire at the shoulder side end portion of the block, is $r_B$; the length of the block of the tread in the circumferential direction of the tire between a circumferential direction end "A" of the block of the tread at the leading edge side (the side in the direction of arrow R) of the shoulder side end portion and a point "B" at which the block 16 protrudes furthest in a radially outward direction of the tire is aL ("a" denotes a ratio between, on the one hand, the length "L" of the block 16, and on the other hand, the length "aL" between the circumferential direction end "A" of the block of the tread at the leading edge side and the point "B", wherein the length "L" of the block 16 in the circumferential direction of the tire is 1, and $0.5 \leq a \leq 1.0$.); the angle which is defined by the circumferential direction end "A" of the block of the tread at the leading edge side and the point "B" when viewed from the rotational axis of the tire is $\theta$ (=$aL/r_T$: wherein radians are used for the unit of the angle); the height of the circumferential direction end "A" of the block of the tread at the leading edge side which is measured from the bottom of the lug groove 14 is $T_1$; the height of the point "B" which is measured from the bottom of the lug groove 14 is $T_2$; and the ratio of the height $T_1$ to the height $T_2$, $T_1/T_2=X$. The surface contour of the block 16 of the actual tread at the shoulder side end portion is formed in a smooth curve which protrudes in the radially outward direction of the tire. The surface contour is in a region between, on the one hand, the circumferential direction contour line of the block of the imaginary tread in which the radius of curvature, which passes through the circumferential direction end "A" and the point "B", of the block in the circumferential direction of the tire is $r_{min}$ when the value of "X" is 0.6, and on the other hand, the circumferential direction contour line of the block of the imaginary tread in which the radius of curvature, which passes through the circumferential direction end "A" and the point "B", of the block in the circumferential direction of the tire is $r_{max}$ when the value of "X" is 0.95.

As illustrated in FIG. 1, the surface contour of the block 16 of the actual tread at an equatorial plane side end portion (the end portion in the direction opposite to the direction of arrow S) of the tire is formed in the shape of an arc. The radius R of curvature of the block in the circumferential direction of the tire substantially corresponds to the radius $R_T (>r_T)$ of the outer circumferential contour of the tire at the equatorial plane side end portion of the tire.

Moreover, the surface of the block 16 of the actual tread is smoothly connected between the equatorial plane side end portion of the tire and the shoulder side end portion.

$$X = \frac{(r_T - r)\cos\theta + \sqrt{r^2\cos^2\theta - (r_T^2 - 2r_Tr)\sin^2\theta} - r_B}{r_T - r_B} \quad (11)$$

In the present embodiment, the length L of the block 16 is 50 mm, the length aL thereof is 25 mm, and a width W thereof in the direction of the rotational axis of the tire is 35 mm. The contour of the block surface of the actual tread at the shoulder side end portion is formed into the shape of a single arc which protrudes in the radially outward direction of the tire. There, the height $T_1$ of the block 16 is 16.6 mm and the height $T_2$ thereof is 17.6 mm so that X (=$T_1/T_2$) is 0.943. The height $T_3$ of the block 16 at a trailing edge portion C is 16.6 mm. The height $T_4$ thereof at the equatorial plane side end portion of the tire is 17.6 mm.

Next, operation of the present embodiment will be described.

Figure 3:
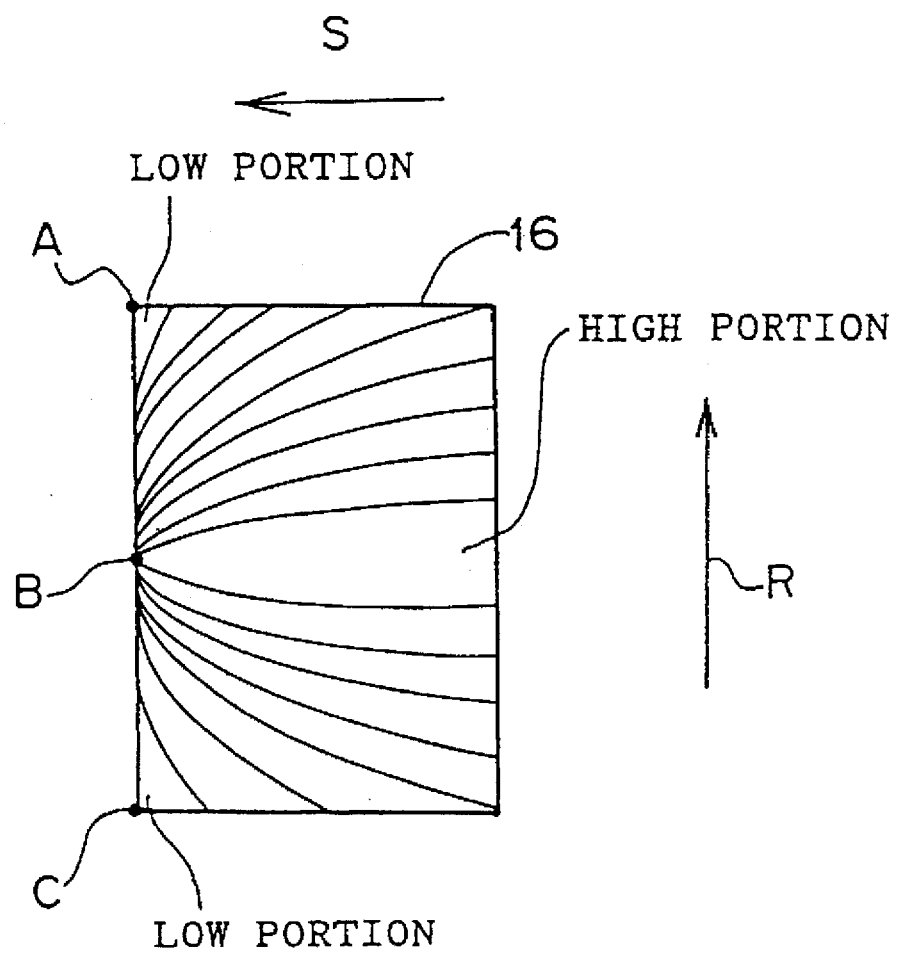
FIG. 3 shows contour lines of the block of the pneumatic tire relating to the first embodiment of the present embodiment.
Figure 4:
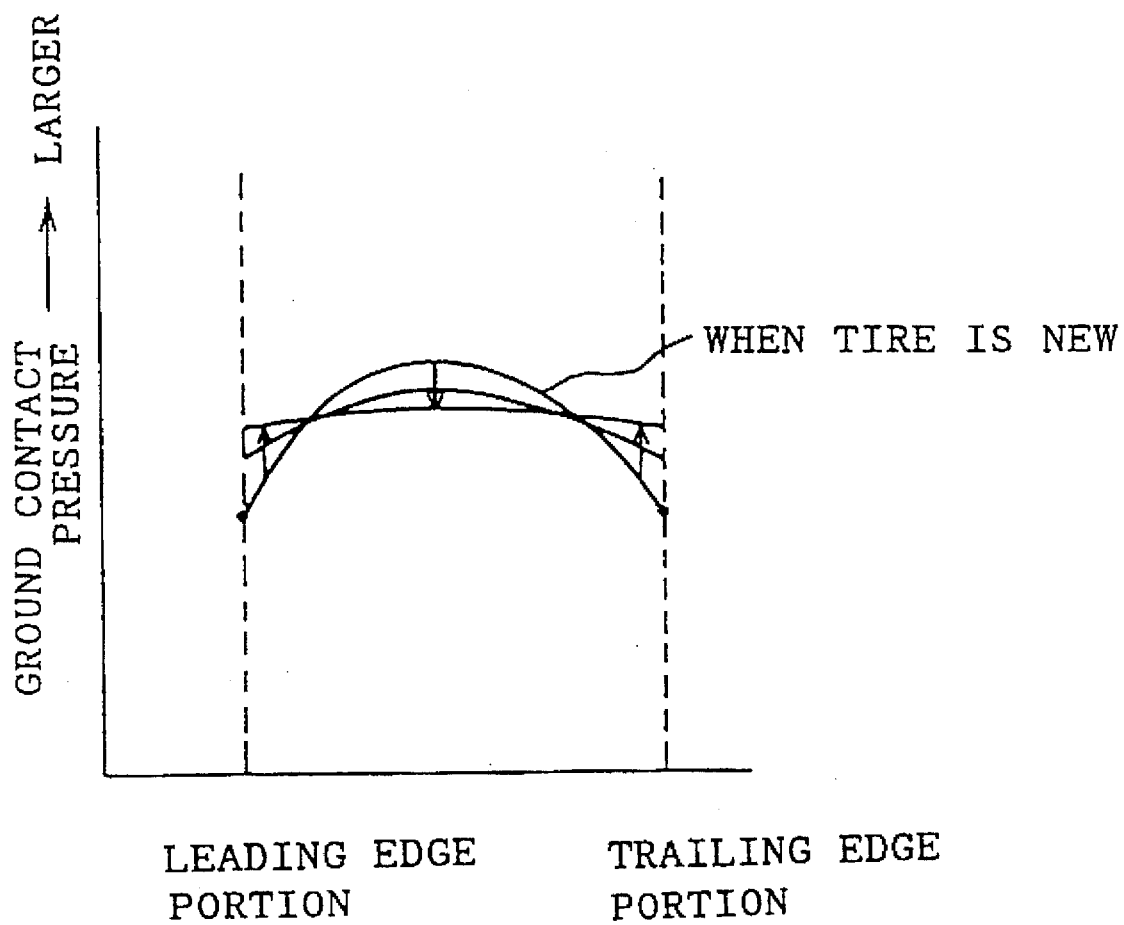
FIG. 4 is a graph which illustrates changes in the ground contact pressure of the block of the pneumatic tire relating to the first embodiment of the present invention.
Figure 5:
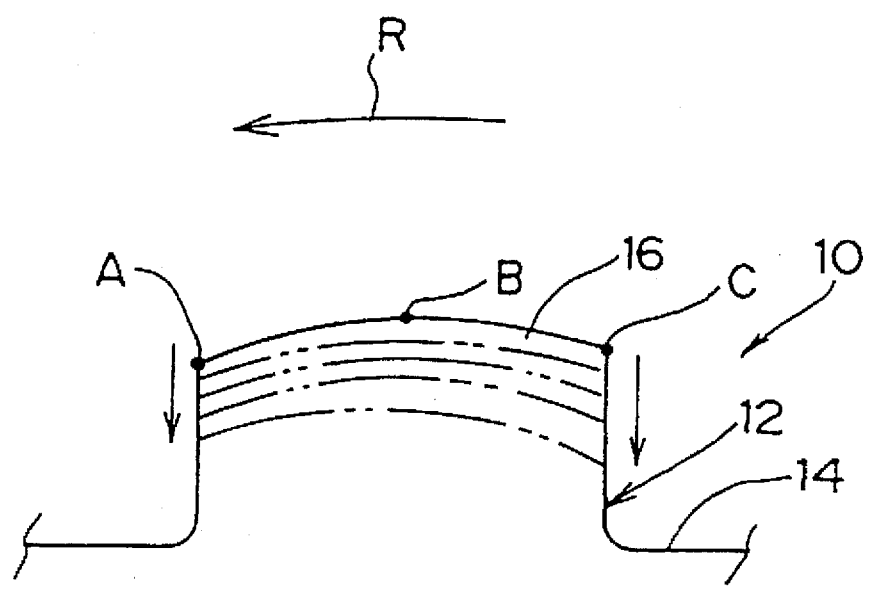
FIG. 5 is a cross-sectional view, of the shoulder side of the block orthogonal to the axis of the tire, which illustrates progress of the wear of the block shown in FIG. 1.

As illustrated in FIG. 1, when the tire is new, the radius of curvature of the block 16 surface of the actual tread substantially corresponds to the radius $R_T$ of the outer circumferential contour of the tire at the equatorial plane side end portion of the tire, and the radius of curvature of the block surface of the tread gradually decreases toward the shoulder side. Accordingly, when the tire is new, the block 16 surface of the actual tread is contoured as shown in FIG. 3.

Further, in the present embodiment, except for the equatorial plane side end portion of the tire, the portion at which the block 16 protrudes furthest in the radially outward direction of the tire (the portion which passes through the points A, B and C at the shoulder side end portion) is located at the block 16 in the circumferential direction central portion of the tire. Therefore, the ground contact pressure from the period when the tire is new to the period when the tire is in the initial stages of wear becomes maximum at the circumferential direction central portion of the block 16 if the equatorial plane side end portion of the tire is excluded (see FIG. 4).

Accordingly, when the pneumatic tire 10 is rotated, the leading edge portion side, whose height is low and whose ground contact pressure is low, of the block 16 slides against the road surface more than the circumferential direction central portion of the block 16. The speed in which wear progresses at the leading edge portion side of the block 16 thereby becomes quicker. The progress of heel-and-toe wear after the initial stages of wear can be delayed (see FIG. 5).

The height of the block 16 at the equatorial plane side end portion is constant. Accordingly, the ground contact pressure is higher at the leading edge portion at the equatorial plane side of the tire than at the leading edge portion at the side opposite to the equatorial plane side thereof. The wear at the leading edge portion, which delays the heel-and-toe wear, progresses from the side opposite to the equatorial plane side of the tire. Accordingly, when the ground contact pressure at the side opposite to the equatorial plane side is reduced, the amount of sliding thereof increases. Thus, progress of the wear from the leading edge portion is promoted and heel-and-toe wear is prevented.

When the value of X exceeds 0.95, the block of the pneumatic tire of the present invention is the same as the block of the conventional pneumatic tire (the radius of outer circumference of the tire is equal to the radius of curvature of the block surface). Consequently, the effect of delaying the progress of the heel-and-toe wear is gone. When the value of X is less than 0.6, the ground contact pressure at the trailing edge portion side becomes extremely low so that the trailing edge portion slides against the road surface more smoothly. Accordingly, the heel-and-toe wear extremely progresses from the initial stages.

Experimental Example 1

The pneumatic tire relating to the present invention, the pneumatic tire relating to the comparative example, and the pneumatic tire relating to the conventional example were manufactured on an experimental basis, and the heel-and-toe wear resistant performances of the respective examples were tested using actual vehicles.

Figure 6:
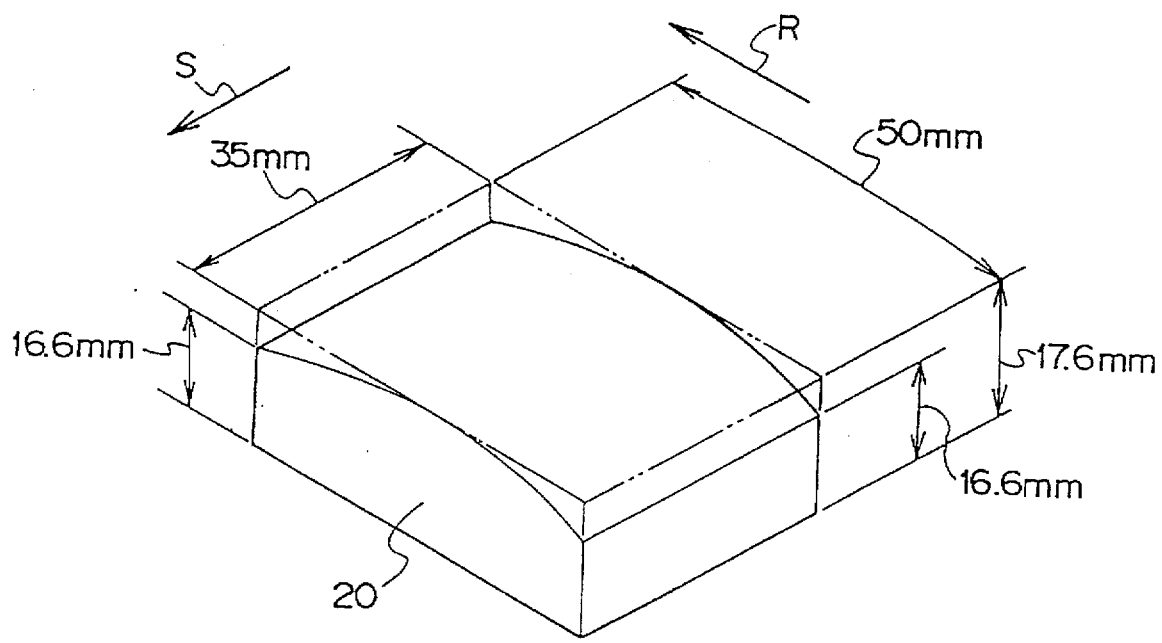
FIG. 6 is a perspective view of a block of a comparative example.
Figure 7:
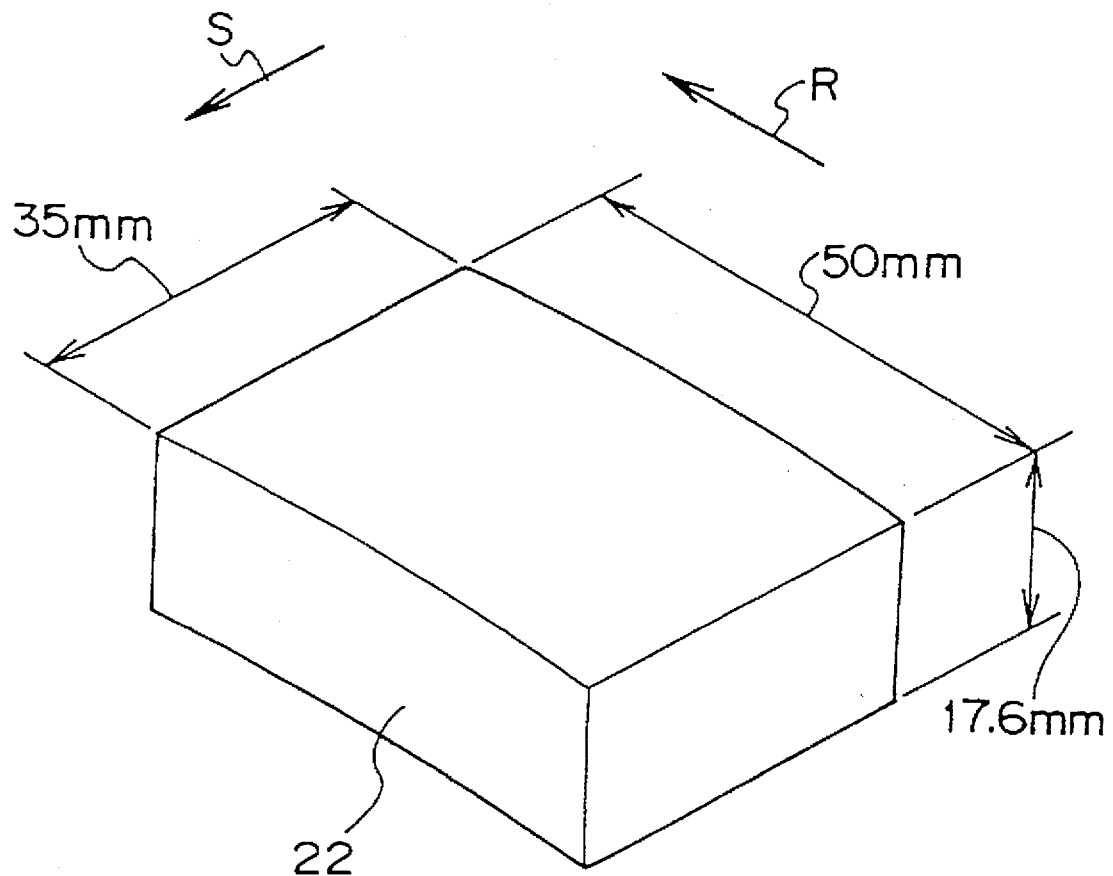
FIG. 7 is a perspective view of the block whose height is kept constant.

The pneumatic tire relating to the present invention is the tire having a block, which has the previously-mentioned shape shown in FIG. 1. As shown in FIG. 6, the pneumatic tire relating to the comparative example is a tire having a block 20 in which the shape of the radially outward surface thereof is the same from the shoulder side end portion to the equatorial plane side end portion of the tire. Alternatively, as shown in FIG. 7, the pneumatic tire relating to the conventional example is a tire having a block 22 whose height is kept constant (17.6 mm).

In all of the experimental tires, the size was 11R22.5 and the internal pressure was 8.5 kg/cm².

Figure 11:
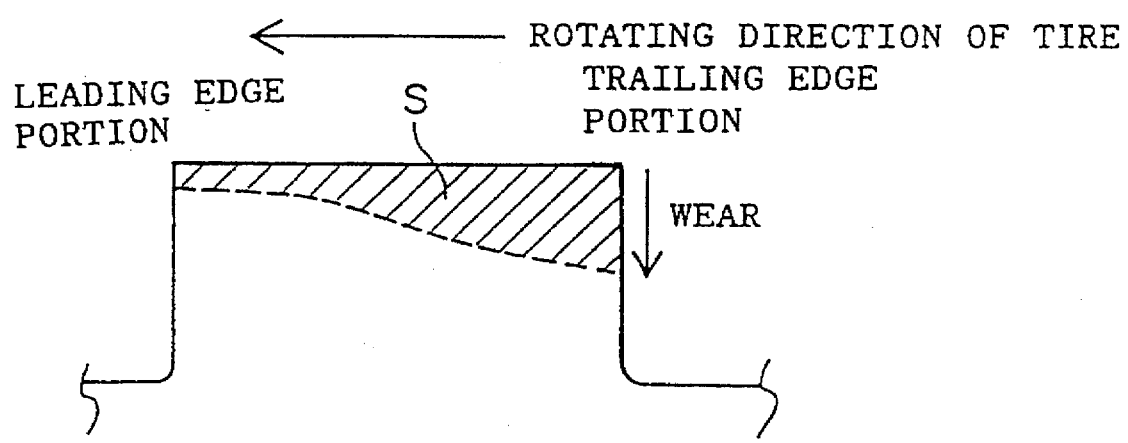
FIG. 11 is a cross-sectional view which illustrates irregular wear of the block whose height is kept constant.
Figure 12:
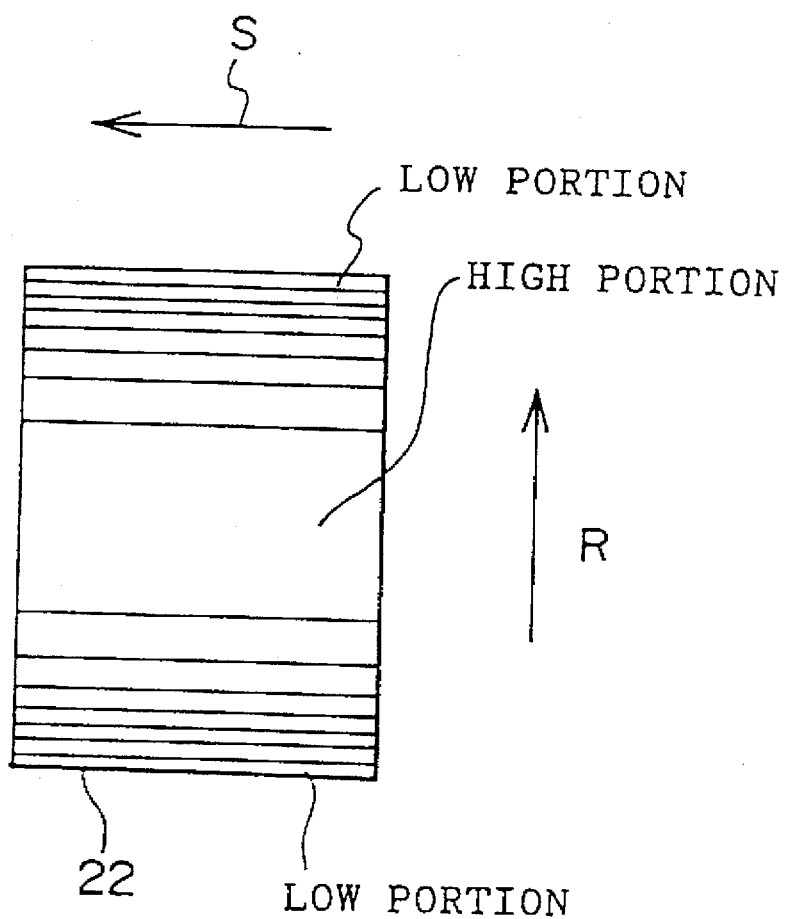
FIG. 12 shows contour lines of the block illustrated in FIG. 6.

The experiment regarding heel-and-toe wear resistant performance was effected in which the experimental pneumatic tires were mounted on the front wheels of the actual vehicles (2D4) which were driven 20,000 km, and thereafter, the volume of the rubber of the blocks which were lost due to the heel-and-toe wear (the hatched portion S in FIG. 11) was measured. The results of the experiment are expressed in Table 1 as an index wherein the amount of rubber lost in the conventional pneumatic tire is 100. The results show that the smaller the numerical value, the better the heel-and-toe wear resistant performance.

TABLE 1

|  | INDEX OF VOLUME OF DIFFERENCE LOST DUE TO HEEL-AND-TOE WEAR |
| --- | --- |
| TIRE OF CONVENTIONAL EXAMPLE | 100 |
| TIRE OF COMPARATIVE EXAMPLE | 90 |
| TIRE OF PRESENT INVENTION | 70 |

From the above-listed results of the experiment, it is clear that the pneumatic tire of the present invention has a higher effect on preventing heel-and-toe wear.

Figure 8:
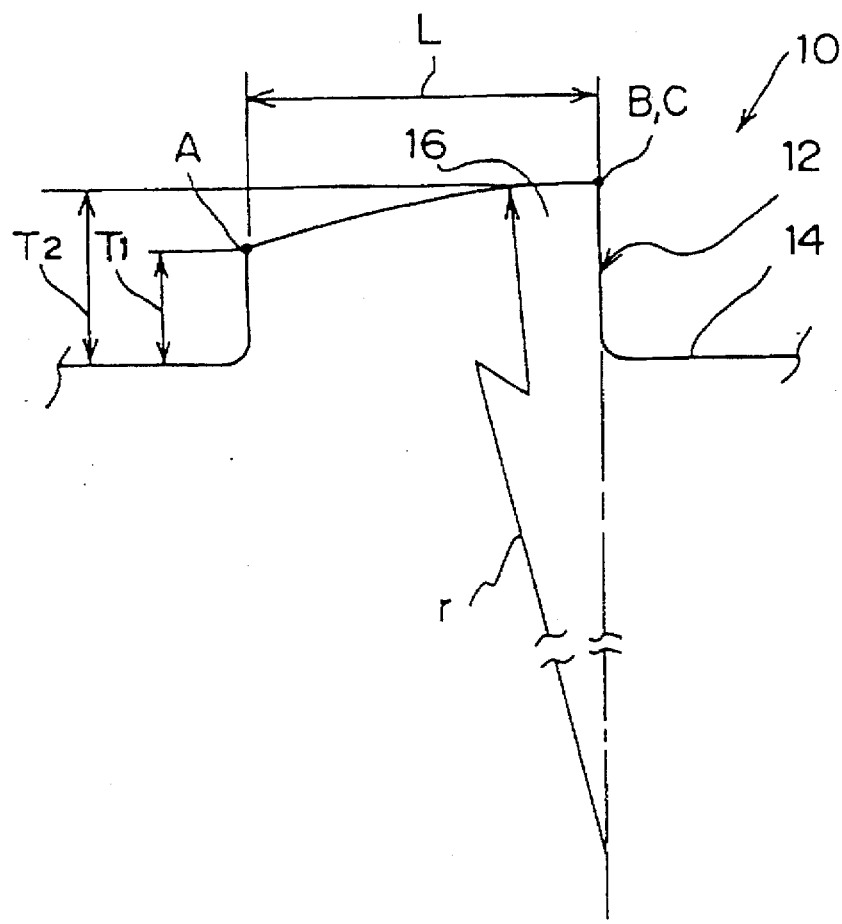
FIG. 8 is a cross-sectional view of the block orthogonal to an axis of the tire relating to another embodiment of the present invention.
Figure 9:
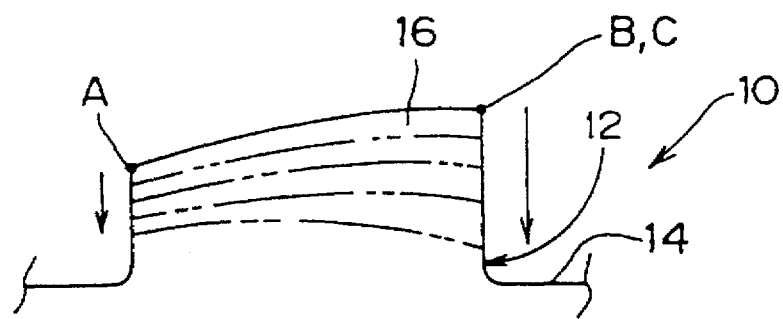
FIG. 9 is a cross-sectional view, of the shoulder side of the block orthogonal to the axis of the tire, which illustrates progress of the wear of the block shown in FIG. 8.
Figure 10:
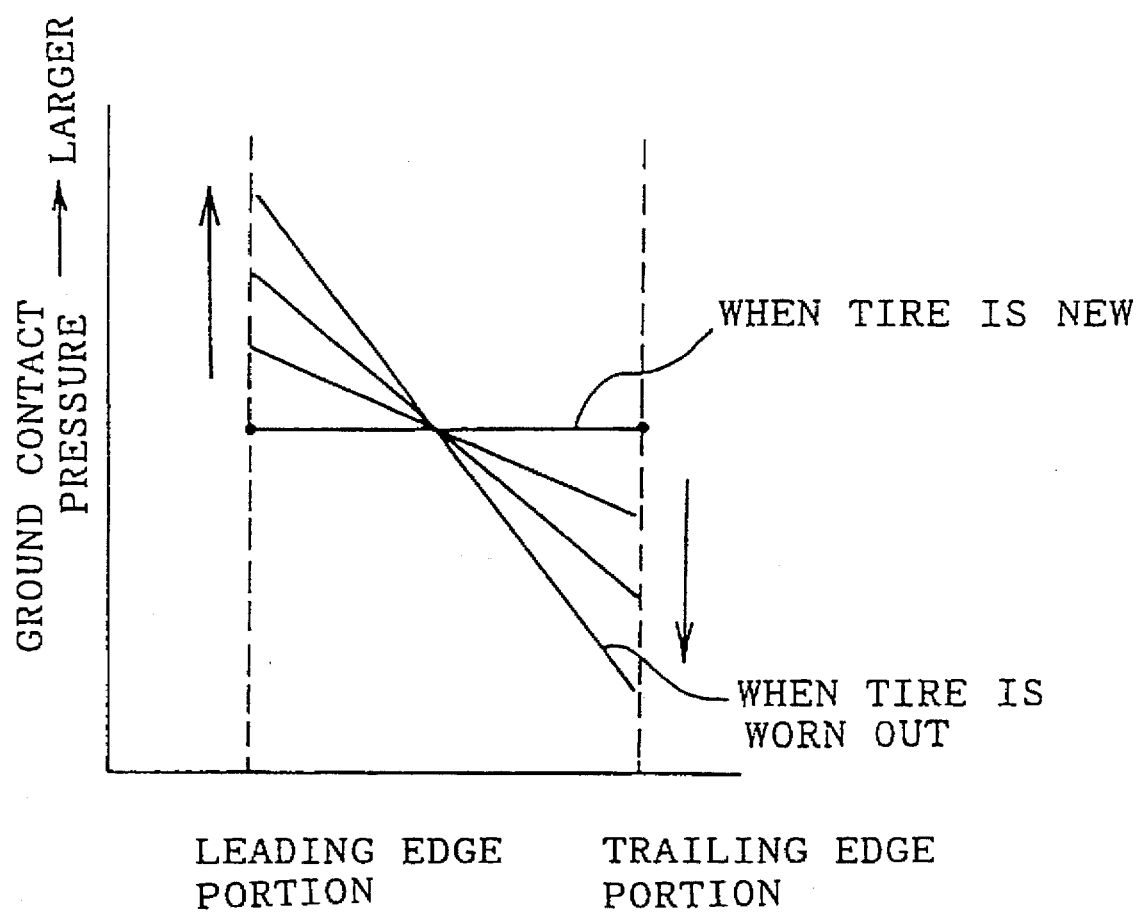
FIG. 10 is a graph which illustrates changes in the ground contact pressure of the respective regions of the block whose height is kept constant.

In a case in which the pneumatic tire has a directional pattern, heel-and-toe wear can be prevented more effectively by moving the point B, in which the block 16 protrudes furthest in the radially outward direction of the tire, toward the trailing edge portion C side. In addition, as shown in FIG. 8, the effect of preventing the heel-and-toe wear can be maximized by corresponding the point B to the trailing edge portion C at the shoulder side end portion. The progress of the wear of the block 16 in FIG. 8 is illustrated in FIG. 9.

In a case in which the point B, in which the block 16 protrudes furthest in the radially outward direction of the tire, is at the circumferential direction central portion of the tire, there is no need to consider both the mounting direction of the tire and the rotating direction of the tire.

In the aforementioned embodiment, the outer contour of the block 16 at the cross section orthogonal to the rotational axis of the tire has a single curvature. However, the present invention is not limited to the same. The shape of the outer contour need not be limited provided that the curve protrudes smoothly in the radially outward direction of the tire.

The heel-and-toe wear easily occurs at the shoulder side of the block. Therefore, as far as the shoulder side of the block 16 is formed as shown in FIG. 1, the effect of preventing the heel-and-toe wear is sufficient. There is no need to form all of the blocks as shown in FIG. 1.

Second Embodiment

A second embodiment of the pneumatic tire of the present invention will be described in accordance with FIGS. 13 and 14. Structures similar to those of the first embodiment are designated by the same reference numerals, and descriptions thereof are omitted.

Figure 13:
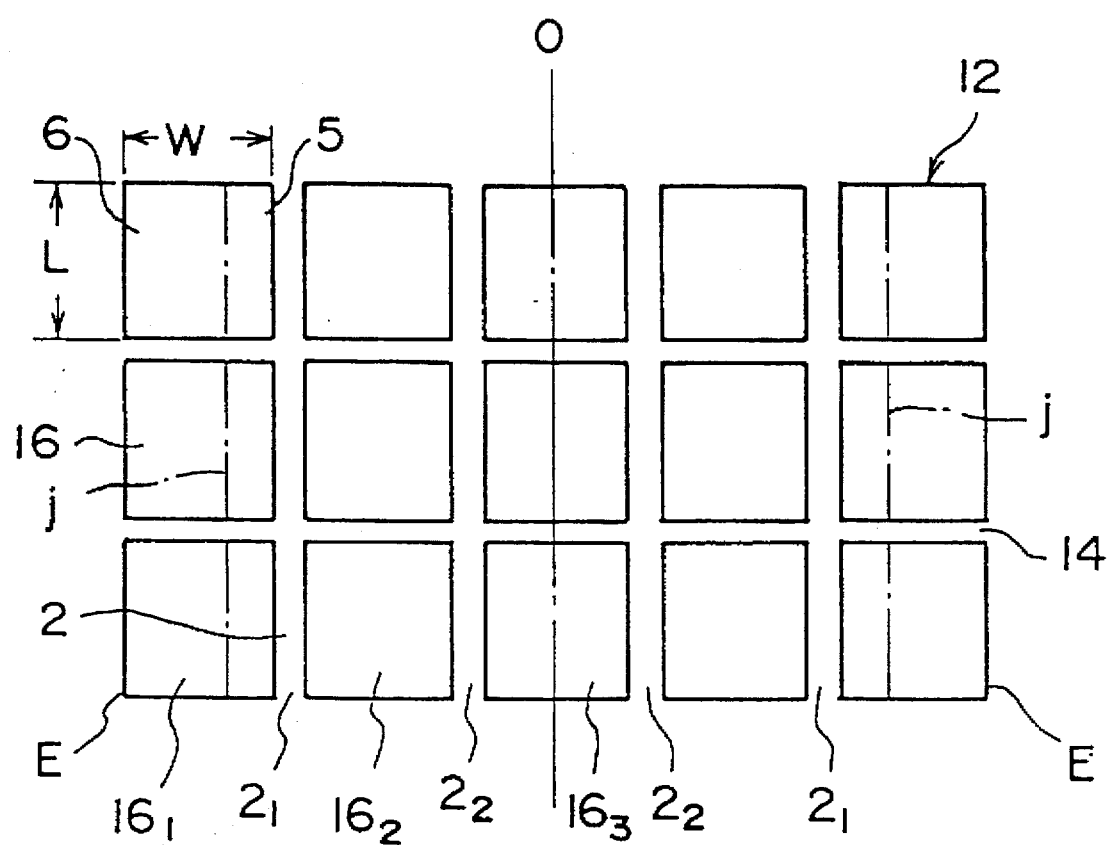
FIG. 13 is a plan view of a tread of the pneumatic tire relating to a second embodiment of the present invention.

FIG. 13 is a plan view of a tread of the tire relating to the present embodiment. FIG. 14 is an enlarged perspective view of the block shown in FIG. 13.

As shown in FIG. 13, the tread 12 includes blocks 16, which are segmented by at least one circumferential direction groove 2 and a plurality of lug grooves 14, in at least one region over the position of equatorial plane O to the tread ends E. The lug grooves 14 intersect the circumferential direction grooves 2 and open at tread ends E. In the example shown in FIG. 13, as the circumferential direction grooves 2, there are a pair of straight shoulder grooves $2_1$, which are located at opposite sides at the left and the right sides of the equatorial plane O, and a pair of straight intermediate grooves $2_2$, which are located between the pair of straight shoulder grooves and at opposite sides of the equatorial plane O. They are disposed at substantially equal intervals. The lug grooves 14 are also illustrated as the grooves orthogonal to the above-described circumferential direction grooves 2. However, besides straight grooves, the variant grooves such as zigzag or sinuous grooves can be used for the respective grooves. The lug grooves 14, in particular, can be provided to slantingly intersect the shoulder circumferential direction grooves $2_1$ and/or the intermediate circumferential direction grooves $2_2$.

In the present embodiment, although not illustrated, both of the side walls of the tire are formed in a toroidal shape between the tread ends E. In addition, as a reinforcing construction, a radial carcass formed by a fiber cord can be used. Also, a well-known structure, in which layers of the inextensional belt are respectively disposed between the carcass and the tread 12 to strengthen the tire, can be used.

In the present embodiment, the shoulder block $16_1$ is interposed between the tread end E and the circumferential direction groove (the shoulder circumferential direction groove) $2_1$, which extends in the vicinity of the tread and E, and includes a first zone 5, which is disposed at the axial direction inner side, and a second zone 6, which is disposed at the axial direction outer side. The second zone 6 includes an outer surface 8 in which the radius r of curvature of the block in the circumferential direction of the tire gradually decreases from the radius $R_1$ or $R_2$ of curvature of an outer surface 7 of the first zone 5 in the circumferential direction of the tire to the axial direction outer side, i.e., the tread end E.

Figure 14:
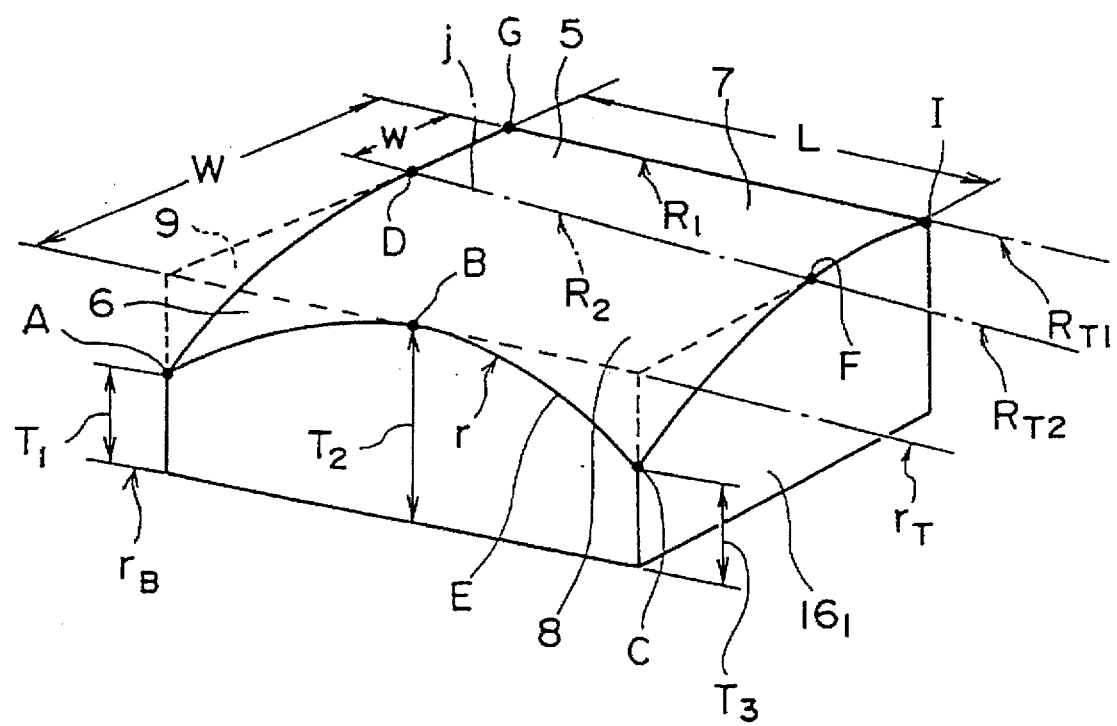
FIG. 14 is an enlarged perspective view of the block shown in FIG. 13.

Further, in accordance with FIG. 14 illustrated as a preferred example, descriptions are given of the radius $R_1$ or $R_2$ of curvature of the outer surface 7, which is surrounded by points G and I and end positions D and F, of the first zone 5 in the circumferential direction of the tire. The points G, I are the corners which face the straight shoulder groove $2_1$, and the end positions D, F are located on the boundary line j of the both zones 5 and 6. The radius $R_1$ or $R_2$ is respectively the same as the radius $R_{T1}$ or $R_{T2}$ of the outer circumferential contour of the tire at their positions.

The outer surface 8 of the second zone 6 is surrounded by the points D, F, which are located on the boundary line j, and the circumferential direction end A of the block of the tread and the trailing edge C, which are located at the axial direction outer end. The outer surface 8 is formed by the radius r of curvature of the block in the circumferential direction of the tire which gradually decreases from the radius $R_2$ of curvature of the block in the circumferential direction of the tire located on the boundary line j to the axial direction outer side. In this case, it is preferable that the point B is included in the surface 9 of the imaginary curve extended from the outer surface 7 of the first zone 5.

In the present embodiment, it is preferred that the value of ratio X is within a range of 0.6 to 0.95.

As described in the example of the shoulder block $16_1$ hereinbefore, it goes without saying that the aforementioned shape of the block can be also used for the intermediate block $16_2$. In addition, although the entire tread is formed by the blocks, as far as the purpose of the present invention is attained, the aforementioned shape of the block can be used for one side of the tread 12 from the equatorial plane O.

In order to confirm the effects of the tire of the present embodiment, radial tires having the size of 10.00R20 were used, and the heel-and-toe wear of the products of the conventional, comparative and present examples was evaluated in a test using actual vehicles. In the test, the block pattern shown in FIG. 13 was used in common for the treads of the respective examples. In this case, the length L, the width W, and the height $T_2$ of the block were 50 mm, 35 mm, and 17.6 mm, respectively.

For the product of the present embodiment, the shape of the block described above was used for the shoulder block $16_1$. In this case, the width w of the first zone 5 was 10 mm, the radius R ($R_1$, $R_2$) of curvature of the block in the circumferential direction of the tire is equal to the radius $R_T$ ($R_{T1}$, $R_{T2}$) of the outer circumferential contour of the tire, and both the height $T_1$ of the circumferential direction end A and the height $T_3$ of the trailing edge C of the second zone 6 of the block of the tread were 15.6 mm. The point B was located at the circumferential direction central portion of the shoulder block $16_1$.

For the comparative product, the shoulder block was formed in a semicylindrical shape in which the radius r of curvature, of the block in the circumferential direction of the tire, passes through the circumferential direction end A of the block of the tread, the point B, and the trailing edge C over the entire width W. In this case, the height $T_1$ was 15.6 mm.

For the conventional product, the entire shoulder block was formed in the shape of the first zone 5 in the above-described product of the present embodiment.

The test tires were mounted on the front wheels of the respective vehicles (2D4), and driving tests were performed by the truck drivers who mainly drive straight and at high speed. As the test conditions, the tires were attached to 7.5×20 rims and the internal pressure of the tires was 8.5 kgf/cm$_2$. After the respective vehicles were driven 20,000 km (20% of the life of the wear), the volume of the difference in wear at the extraordinarily worn portions of the shoulder block was respectively measured. The results show that the volume was 1,220 mm$^3$ (index was 100) for the conventional product and 732 mm$^3$ (index was 60) for the comparative example. Compared to these results, the volume was 695 mm$_3$ (index was 57) for the product of the present embodiment. The desirable result was thereby obtained.

What is claimed is:

1. A pneumatic tire comprising; a pair of sidewalls and a cylindrical tread which extends over the sidewalls, said sidewalls and said tread connected in a toroidal shape, said tread having blocks which are segmented by at least one circumferential direction groove and a plurality of lug grooves which intersect said circumferential direction groove and open at tread ends, an outer surface of a block being formed so that a radius of curvature of an end portion of the block in the circumferential direction of the tire at an axial direction outer side of the tire is smaller than a radius of curvature of an end portion of the block in the circumferential direction of the tire at an equatorial plane side of the tire, and said radius of curvature of the end portion of the block in the circumferential direction of the tire at the axial direction outer side of the tire is smaller than a radius of curvature of the tire at the end portion of the block in the circumferential direction of the tire at said axial direction outer side of the tire.

2. A pneumatic tire in accordance with claim 1, wherein the outer surface of said block smoothly connects the end portion at said equatorial plane side and the end portion at said axial direction outer side.

3. A pneumatic tire in accordance with claim 1, wherein the end portion at said equatorial plane side has a radius of curvature which substantially corresponds to a radius of curvature of the tire.

4. A pneumatic tire in accordance with claim 3, wherein the radius of curvature of the block decreases from the end portion at said equatorial plane side to the end portion at said axial direction outer side.

5. A pneumatic tire in accordance with claim 1, wherein a circumferential direction central portion at the outer surface of said block substantially corresponds to the radius of the tire of an outer circumferential contour of the tire at corresponding positions along the axial direction of the tire.

6. A pneumatic tire comprising; a pair of sidewalls and a cylindrical tread which extends over the sidewalls, said sidewalls and said tread connected in a toroidal shape, said tread includes blocks which are segmented by at least one circumferential direction groove and a plurality of lug grooves which intersect said circumferential direction groove and open at the tread ends, said blocks each comprise a first zone which is located at an axial direction inner side of the block and a second zone which is located at an axial direction outer side of the block, said second zone includes an outer surface whose radius of curvature in the circumferential direction of the tire decreases toward the axial direction outer side of the block from the radius of curvature in the circumferential direction of the tire of the outer surface of said first zone.

7. A pneumatic tire in accordance with claim 6, wherein the radius of said first zone corresponds to the radius of the tire at corresponding positions along the axial direction of the tire.

8. A pneumatic tire in accordance with claim 6, wherein a circumferential direction central portion at the outer surface of said block substantially corresponds to the radius of the tire at corresponding positions along the axial direction of the tire.

9. A pneumatic tire in accordance with claim 6, wherein said blocks are located at the shoulder portion of said tire.

10. A pneumatic tire comprising; a pair of sidewalls and a cylindrical tread which extends over the sidewalls, said sidewalls and said tread connected in a toroidal shape, said tread includes blocks which are segmented by at least one circumferential direction groove and a plurality of lug grooves which intersect said circumferential direction groove and open at the tread ends, wherein the radius of curvature of said blocks in the circumferential direction of the tire at a shoulder side end portion is r;

the radius of the outer circumference of the tire at said shoulder side end portion is $r_T$;

the length of each of said blocks of the tread in the circumferential direction of the tire at said shoulder side end portion is L;

the distance from the rotational axis of the tire to the bottom of a lug groove which is positioned at said shoulder side end portion, is $r_B$;

the length of each of said blocks in the circumferential direction of the tire between a circumferential direction end A of each of the blocks at the leading edge side of said shoulder side end portion and a point B at which each of said blocks protrude furthest in a radially outward direction of the tire is aL, where: a denotes a ratio between, the length aL between the circumferential direction end A of each of the blocks at said leading edge side of said point B and the length L of each of the blocks at the shoulder side end portion thereof; wherein the length L of each of the blocks in the circumferential direction of the tire is 1, and $0.5 < a < 1.0$;

an angle defined by the circumferential direction end A of each of the blocks at said leading edge side and said point B and the rotational axis of the tire is $\theta = aL/r_T$: wherein radians are used for the unit of the angle;

the height of the circumferential direction end A of each of the blocks at said leading edge side which is measured from the bottom of said lug groove is $T_1$;

the height of said point B which is measured from the bottom of said lug groove is $T_2$;

the ratio X of the height $T_1$ of the circumferential direction end A of each of the blocks at said leading edge side to the height $T_2$ of said point B is in the range of 0.6 to 0.95, and conforms to the following formula;

$$X = \frac{(r_T - r)\cos\theta + \sqrt{r^2\cos^2\theta - (r_T^2 - 2r_Tr)\sin^2\theta} - r_B}{r_T - r_B}$$

in a region between, on the one hand, the circumferential direction contour line of each of the blocks of an imaginary tread which passes through the circumferential direction end A of each of the blocks at said leading edge side and the point B when said value of X is 0.6, and on the other hand, the circumferential direction contour line of the block of an imaginary tread which passes through the circumferential direction end A of each of the blocks at said leading edge side and the point B when said value of X is 0.95, the surface contour of the block of the actual tread at said shoulder side end portion is formed in a smooth curve which protrudes in the radially outward direction of the tire;

the radius R of curvature, in the circumferential direction of the tire, of the surface contour of each of said blocks of the actual tire at an equatorial plane side end portion of the tire substantially corresponds to a radius $R_T$ of the outer circumferential contour of the tire at said equatorial plane side end portion of the tire; and the surface of each of said blocks smoothly connects said equatorial plane side end portion and said shoulder side end portion.

* * * * *